United States Patent
Neidermyer et al.

(10) Patent No.: US 10,432,487 B2
(45) Date of Patent: Oct. 1, 2019

(54) SYSTEM AND METHOD FOR OFFLINE SURVIVABILITY

(71) Applicant: Genesys Telecommunications Laboratories, Inc., Chantilly, VA (US)

(72) Inventors: Richard M. Neidermyer, Lititz, PA (US); Kevin Elliott King, Bargersville, IN (US); Felix Immanuel Wyss, Zionsville, IN (US)

( * ) Notice: Subject to any disclaimer, the term of this patent is extended or adjusted under 35 U.S.C. 154(b) by 4 days.

(21) Appl. No.: 16/055,118

(22) Filed: Aug. 5, 2018

(65) Prior Publication Data

US 2018/0343180 A1 Nov. 29, 2018

Related U.S. Application Data

(63) Continuation of application No. 14/674,437, filed on Mar. 31, 2015, now Pat. No. 10,069,700.

(51) Int. Cl.
| | | |
|---|---|---|
| *G06F 13/00* | (2006.01) | |
| *H04L 12/26* | (2006.01) | |
| *H04L 29/06* | (2006.01) | |
| *H04L 29/08* | (2006.01) | |
| *H04L 29/14* | (2006.01) | |

(52) U.S. Cl.
CPC ...... *H04L 43/0811* (2013.01); *H04L 63/0428* (2013.01); *H04L 67/2842* (2013.01); *H04L 69/40* (2013.01)

(58) Field of Classification Search
CPC . H04L 69/40; H04L 43/0811; H04L 43/0823; H04L 67/0428; H04L 67/2842; H04L 63/0428
USPC .................................. 709/238, 203; 714/43
See application file for complete search history.

(56) References Cited

U.S. PATENT DOCUMENTS

| | | | |
|---|---|---|---|
| 7,272,662 B2 | 9/2007 | Chesnais et al. | |
| 7,707,308 B1 | 4/2010 | Hogge, Jr. et al. | |
| 7,869,425 B2 | 1/2011 | Elliott et al. | |
| 8,533,857 B2 | 9/2013 | Tuchman et al. | |
| 8,671,206 B2 | 3/2014 | Fieremans et al. | |
| 9,106,452 B2 * | 8/2015 | Basart | H04L 12/6418 |
| 9,781,253 B2 * | 10/2017 | Lum | H04L 65/1006 |
| 10,069,700 B2 * | 9/2018 | Neidermyer | H04L 43/0811 |

(Continued)

FOREIGN PATENT DOCUMENTS

WO 2015143408 A1 9/2015

OTHER PUBLICATIONS

Extended European Search Report for Application No. 15887980.9, dated Feb. 28, 2018, 12 pages.

(Continued)

*Primary Examiner* — Kenneth R Coulter

(57) ABSTRACT

A system and method are presented for on premises and offline survivability of an interactive voice response system in a cloud telephony system. Voice interaction control may be divided from the media resources. Survivability is invoked when the communication technology between the Cloud and the voice interaction's resource provider is degraded or disrupted. The system is capable of recovering after a disruption event such that a seamless transition between failure and non-failure states is provided for a limited impact to a user's experience. When communication paths or Cloud control is re-established, the user resumes normal processing and full functionality as if the failure had not occurred.

12 Claims, 3 Drawing Sheets

(56) References Cited

U.S. PATENT DOCUMENTS

| | | |
|---|---|---|
| 2005/0203673 A1 | 9/2005 | El-Hajj et al. |
| 2009/0109959 A1 | 4/2009 | Elliott et al. |
| 2011/0096762 A1* | 4/2011 | Basart ................ H04L 12/6418 370/338 |
| 2012/0266258 A1 | 10/2012 | Tuchman et al. |
| 2013/0066960 A1 | 3/2013 | Fieremans et al. |
| 2014/0269446 A1 | 9/2014 | Lum et al. |
| 2014/0304804 A1 | 10/2014 | Lee et al. |
| 2015/0237155 A1* | 8/2015 | Power ................ H04L 67/2814 709/219 |

OTHER PUBLICATIONS

Australian Government IP Australian Examination Report No. 1 for Application No. 2015390031, dated Jun. 25, 2018, 5 pages.

\* cited by examiner

300

SYSTEM AND METHOD FOR OFFLINE SURVIVABILITY

CROSS-REFERENCE TO RELATED APPLICATIONS

The present application is a continuation of U.S. patent application Ser. No. 14/674,437, filed Mar. 31, 2015, now issued as U.S. Pat. No. 10,069,700, and titled SYSTEM AND METHOD FOR OFFLINE SURVIVABILITY. The disclosure of the prior application is considered part of and is incorporated by reference in the disclosure of this application.

BACKGROUND

The present invention generally relates to telecommunications systems and methods, as well as cloud applications. More particularly, the present invention pertains the offline survivability of an Interactive Voice Response (IVR) system in a cloud telephony system.

SUMMARY

A system and method are presented for on premises and offline survivability of an interactive voice response system in a cloud telephony system. Voice interaction control may be divided from the media resources. Survivability is invoked when the communication technology between the Cloud and the voice interaction's resource provider is degraded or disrupted. The system is capable of recovering after a disruption event such that a seamless transition between failure and non-failure states is provided for a limited impact to a user's experience. When communication paths or Cloud control is re-established, the user resumes normal processing and full functionality as if the failure had not occurred.

In one embodiment, a method for offline survivability in a cloud based communication system, wherein the system comprises at least a cloud application and a media server, is presented, the method comprising the steps of receiving, by the media server, a communication from a user; providing, by the user, input to the media server through a point-to-point connection; receiving, by the user, a response from the media server, wherein the media server services the audio flow and executes application instructions received by the cloud application; and determining whether a communication path has been disrupted between the media server and the cloud application, wherein if the communication path has been disrupted, invoking survivability.

In another embodiment, a method for offline survivability in a cloud based communication system is presented, wherein the system comprises at least a cloud application which communicates with a media server via a communication path, the method comprising the steps of: determining whether the communication path has been disrupted, wherein if the communication path has been disrupted, invoking survivability; and performing a system recovery without a noticeable user interruption of the cloud application.

In another embodiment, a system for offline survivability in a cloud based communication system is presented comprising: a media server comprising an interactive voice response system; and a cloud application, wherein said cloud application is configured to communicate with the media server over a network communication path.

In yet another embodiment, a physical media server, operatively coupled to a communication path, executing instructions stored on a non-transitory computer medium, wherein the media server is capable of responding to a disruption of the communication path, is presented comprising: a processor; and a memory in communication with the processor, the memory storing instructions that, when executed by the processor, causes the processor to respond to the disruption by: continuing to receive and process input during the disruption; retaining the input for future delivery to a cloud application via the communication path; determining whether the communication path has been restored; and delivering the retained input to the cloud application in response to determining that the communication path has been restored.

DETAILED DESCRIPTION

Figure 1:
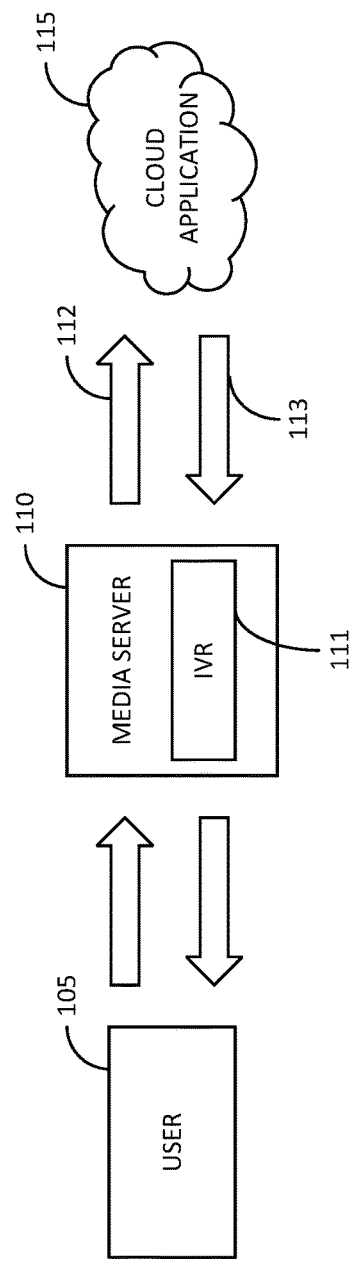
FIG. 1 is a diagram illustrating an embodiment of an on premises system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In an embodiment of a typical on premises system architecture for a media Interactive Voice Response (IVR) flow, the system comprises a number of key entities and communication paths. FIG. 1 is a diagram illustrating an embodiment of an on premises system, indicated generally at 100. Remote computing topology may occur in any scenario where a media server is not physically connected to the computing resources which control communication flow and providing instructions. While common in a Cloud architecture, the system described may also apply in any environment where there is a network communication path between a media server and computing resources.

The User 105 comprises a primary user, such as a caller, of the media system and is the recipient of the IVR application 111. In an embodiment, the user 105 may provide input to the IVR application 111 directly to the Media Server 110 through a point-to-point connection and receive the response of the IVR application 111. It should be noted that it is within the scope of the embodiments disclosed herein that Users may also comprise Users of video communications, text chats, and other similar forms of communication and media.

The Media Server 110 comprises an IVR application 111 and executes the IVR application 111. The Media Server 110 may also provide the actual serving of audio to a User 105 and processing the User 105 responses. The Media Server 110 may also act as an intermediary between the User 105 and the Cloud Application 115 to service audio flow and execute application instructions, such as VoiceXML, CCXML, or similar. The Media Server 110 may need to communicate to the Cloud Application 115 at any time, such as by using an API to receive further instructions, retrieve audio resources, or fetch speech recognition grammars, for example.

The Media Response Path 112 comprises a network communication path which may provide a User's responses to an executing IVR 111 to the Cloud Application 115. The Cloud Application 115 evaluates these responses to determine the next communication or IVR media control path for the User 105.

The Media Control Path 113 comprises a communication path that provides the application instructions to the Media Server 110 for the media flow. The Media Control Path 113 may also serve media resources to the Media Server 110 in the form of documents.

The Cloud Application 115, in an embodiment, controls the Media Server 110 providing access to the logic in the form of script documents and access to audio resources using an API for the Media Server 110 to execute. The Cloud Application 115 may be maintained remotely from the physical Media Server 110 and communicate with one or more media servers over a network, inclusive of the Internet.

Figure 2:
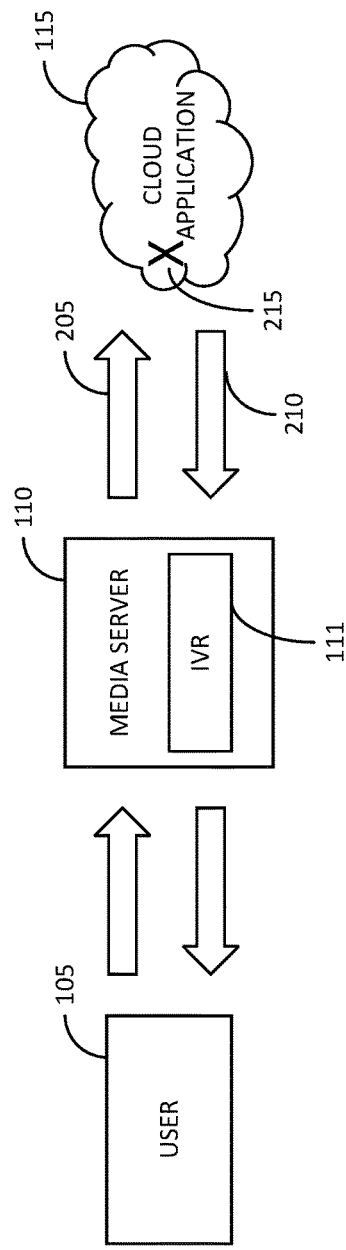
FIG. 2 is a diagram illustrating an embodiment of failure points of an on premises system.

Failure of points within the cloud telephony system architecture may result in IVR application failure. FIG. 2 a diagram illustrating an embodiment of failure points of an on premises system, indicated generally at 200. In an embodiment, the Media Response Path 205 may fail and result in an outage. A failure of the Media Response path 205 may result in a lack of response from the Media Server 110 to the Cloud Application 115. Without proper responses, the Cloud Application 115 will be unable to further direct a User 105 on the telephony system, resulting in the disconnection of the User 105. A loss of User input and abandonment of data may also occur, such as voicemail and fax data.

In another embodiment, the Media Control Path 210 may fail and result in an outage, similarly to the Media Response Path 205. This failure may occur over a brief or extended period of time where data is unable to be routed from the Cloud Application 115 to the Media Server 110. This failure may result in a loss of control of the media application executing on the Media Server 110 with an eventual complete loss of IVR functionality and interaction with the User 105.

In yet another embodiment, the Cloud Application may fail or the application host may encounter failure, indicated at 215. During this failure period, the Cloud Application would become unresponsive to its API requests and fail to serve documents and control the media IVR.

The described failure points are capable of failing simultaneously (such as in the case of shared paths and equipment) or they may fail independently of each other. Recovery results may vary, resulting in disjoint behavior between the Cloud Application 115 and the Media Server 110. A voice interaction would be considered to be in a failed state with the loss of any of the points and a poor user experience would occur with the cloud telephony system as well as potential loss of data.

Survivability of a Communication Failure focuses on providing the Media Server with necessary resources and logic paths to complete an entire user interaction without a communication roundtrip to the clod application. The users of the telephony system are able to proceed with their interactions with the IVR without knowledge of the failure state.

Figure 3:
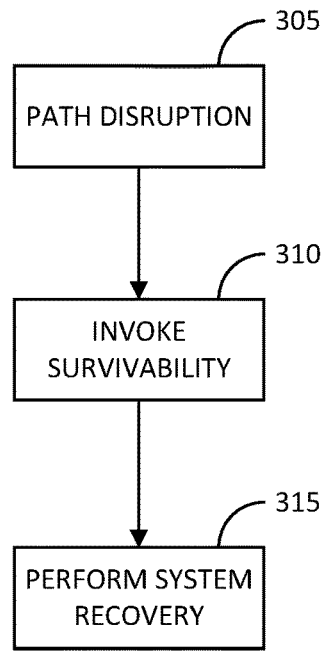
FIG. 3 is a flowchart illustrating an embodiment of a process for system recovery in the event of path disruption.

FIG. 3 is a flowchart illustrating an embodiment of a process for system recovery in the event of path disruption, indicated generally at 300. This process is triggered when a path disruption, such as illustrated in FIG. 2, occurs.

In operation 305, a path disruption has been determined to occur by the system. For example, a failure point may be indicated by the system along the media control network path, the media response network path, and/or a failure of the cloud application or host of the application. The failure points may fail simultaneously in the case of shared paths and equipment or they could fail independently of each other. Control is passed to operation 310 and process 300 continues.

In operation 310, survivability is invoked. For example, the media server needs to be provided with necessary resources and logic paths in order to complete an entire voice interaction without a communication roundtrip to the cloud application. This may be performed with a media server resource cache, host route operations, and load distribution, for example.

A dynamic local cache on the media server may be used to ensure that the resources needed to complete an IVR interaction are local to the device and can be accessed even when the cloud application download path has failed. In order to complete an IVR session, the media server host that is local to the point-to-point media caller connection must have access to the media resources. Media resources are inclusive of audio files, grammar definitions, and language models. In a static telephony system, these resources may be managed locally. In a cloud application telephony system, these resources are dynamic in nature and subject to continuous change, which is not conducive to a traditional local install approach.

The cache is capable of continuous resource updates during the periods that it has connectivity to the cloud application. The most recent and desirable resources for application are maintained for the application and are executed on the next IVR request. The cache may be controlled by the cloud application using cache attributes such as max valid and max stale values, for example. In an embodiment, the IVR is capable of executing an outdated interaction, due to a long period connectivity loss, but still succeed in a successful interaction with the user without the user noticing the failure.

Host route operations allow successful IVR sessions by performing the sequence on the host without any communication to the cloud application. For example, the cloud application is in control of the media operations as well as communication control to route a specific user to a specific destination endpoint (such as the IVR). As the media server is a local point-to-point connection with the user that is unaffected by communication path failures, it must also be able to route that user and initiate an IVR session. This is accomplished by leveraging the local resource cache and having it include the caller route information necessary to direct an IVR. The cached resource includes ANI and DNIS route match criteria, potentially a language tag, and other meta-data delivered by an operator.

When a user interaction is received on the system, the cached local route data is referenced to direct the user to the appropriate IVR. In times of connectivity, this may include a roundtrip message with the cloud application. During failed connectivity, this sequence may be performed effectively on the host without any communication to the cloud application providing a successful IVR session to the user.

Load distribution allows IVR users to be effectively routed to different media servers within the group to maintain a balanced load across the local system during the periods that the cloud application is unable to communicate with the media server(s). During a period where a media server or multiple media servers are disconnected from the cloud operation, there is potential to overload any single media server in the group with too many IVR sessions. A load distribution routine is performed as a component of host route operations. The route data maintains knowledge of all of the media servers that the cloud application has directed to service a specific group of calls and thus, effectively route IVR users to different media servers within the group. Control is passed to operation 315 and process 300 continues.

In operation 315, system recovery is performed. It is necessary to be able to fully recover from the disconnection period without any loss of data. The IVR interaction with a user has occurred and responses are recorded by the media server (e.g. DTMF and speech input, recordings, faxes, voicemail, communication information, interaction details, etc.). The media server needs to deliver that information to the cloud application so that it can complete its interaction process flow. Recovery may occur in real time, allowing the cloud application to exert control over in-progress IVR interactions. Processes such as event queuing and input retention may be used for recovery.

During the process of a normal IVR flow execution, one or more communication events are sent to the cloud application to drive the overall system's functionality and reporting. During a period of connection failure, these events do not reach the cloud application. The events must not be discarded. A delivery queue capable of storing these events locally with time sequence may be implemented. Events may also be persisted to non-volatile memory to allow for recovery through periods of media server downtime that may occur before network connectivity is restored, or before full recovery is completed. The event queuing mechanism is able to self-diagnose communication path failures and being queuing as necessary. The event queuing mechanism is also able to determine when the upload communication path is reestablished to begin its recovery process with the cloud application. Upon recovery, all events are delivered to the cloud application with original time sequencing intact. The cloud application is further capable of disambiguating current live activity from historical activity that occurred during a period of communication failure.

Host input retention provides for a complete and uninterrupted IVR experience for a user during the period of communication failure. Many IVR applications require that user input be played back to the caller for verification purposes. Retaining such data on the host provides for this requirement even during a period of network communication loss where the cloud application API cannot be accessed by the IVR for instructions to execute.

IVRs are often used to receive input from a user in the form of voice (such as a recording), input (DTMF, ASR), or data (fax), for example. During communication path failure, the media server must continue to receive and process this input. The data must also be retained for future delivery to the cloud application. In an embodiment, input retention may use event queuing as a portion of its implementation. Input retention provides a mechanism for the media server to store user-input data during failure and deliver that data upon recovery. Data, such as voicemails or credit card numbers, may be sensitive and require additional security measures. As such, the data may be encrypted on the host during the disruption period for a secure delivery of the data when the upload communication path is recovered.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A physical media server, operatively coupled to a communication path, executing instructions stored on a non-transitory computer medium, wherein the media server is capable of responding to a disruption of the communication path, comprising:
   a processor; and
   a memory in communication with the processor, the memory storing instructions that,
   when executed by the processor, causes the processor to respond to the disruption by:
      continuing to receive and process input during the disruption;
      retaining the input in a local delivery queue with time sequence for future delivery to a cloud application via the communication path;
      determining whether the communication path has been restored; and
      delivering the retained input to the cloud application in response to determining that the communication path has been restored with the time sequence intact, wherein the cloud application disambiguates live activity from historical activity occurring during the disruption based on the time sequence.

2. The media server of claim 1, wherein the media server is capable of completing the response without a communication roundtrip to the cloud application.

3. The media server of claim 2, wherein the media server capability comprises providing at least one of: a media server resource cache, host route operations, and load distribution.

4. The media server resource cache of claim 3, wherein the media server resource cache is capable of access when a download path of the cloud application fails.

5. The host route operations of claim 3, wherein the host route operations comprise:
   leveraging local resource caches and including caller route information;
   referencing local route data; and
   directing the communication to an interactive voice response system.

6. The load distribution of claim 3, wherein the load distribution comprises routing a user to different media servers within a grouping of a plurality of media servers, wherein the grouping of the plurality of media servers is directed by the cloud application to service a specific grouping of users, and wherein a balanced load is maintained across the grouping of a plurality of media servers.

7. The media server of claim 1, wherein the media server comprises an interactive voice response system.

8. The delivery of claim 1, wherein said delivery is performed via the delivery queue for retained input, wherein the retained input comprises communication events.

9. The retained input of claim 8, wherein the retained input further comprises data.

10. The data of claim 9, wherein the data has been stored on the media server during the communication path disruption.

11. The data of claim 10, wherein the data is encrypted while being stored on the physical media server during the communication path disruption.

12. The data of claim 11, wherein the data comprises at least one of: communication recordings, voicemail, faxes, communication information, DTMF, speech input, and interaction details.

* * * * *